March 26, 1963  F. J. HOGGUER  3,082,602
ROTARY INTERNAL COMBUSTION ENGINE
Filed June 2, 1959  4 Sheets-Sheet 1

INVENTOR.
Fredrik Jeremias Hogguer
BY

March 26, 1963  F. J. HOGGUER  3,082,602
ROTARY INTERNAL COMBUSTION ENGINE
Filed June 2, 1959  4 Sheets-Sheet 2

INVENTOR.
FREDRIK JEREMIAS HOGGUER
BY
Attorney

March 26, 1963 F. J. HOGGUER 3,082,602
ROTARY INTERNAL COMBUSTION ENGINE
Filed June 2, 1959 4 Sheets-Sheet 3

INVENTOR.
Fredrik Jeremias Hogguer
BY

March 26, 1963　　　F. J. HOGGUER　　　3,082,602
ROTARY INTERNAL COMBUSTION ENGINE
Filed June 2, 1959　　　　　　　　　　　　4 Sheets-Sheet 4
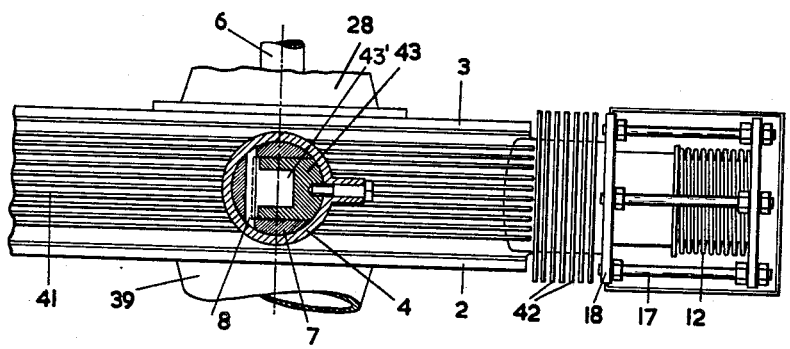
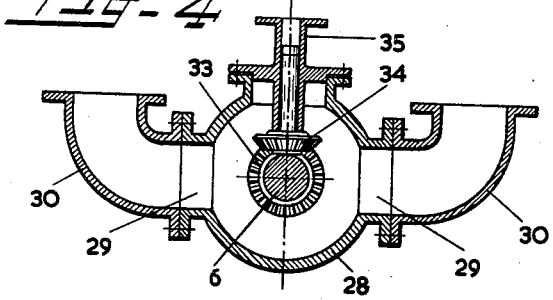
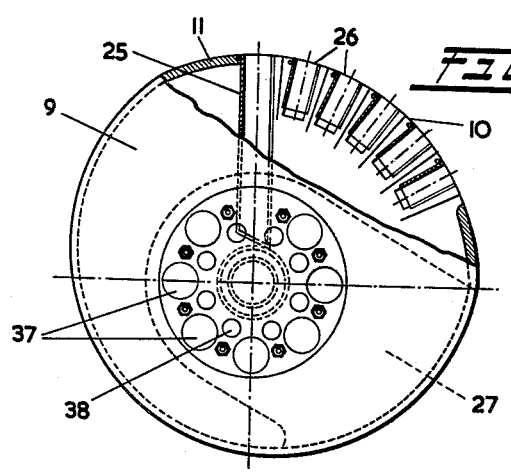
INVENTOR.
Fredrik Jeremias Hogguer
BY ns Patent Office 3,082,602
Patented Mar. 26, 1963

3,082,602
ROTARY INTERNAL COMBUSTION ENGINE
Fredrik Jeremias Hogguer, Nieuw Loosdrechtsedijk 264, Nieuw Loosdrecht, Netherlands
Filed June 2, 1959, Ser. No. 817,648
Claims priority, application Netherlands June 4, 1958
6 Claims. (Cl. 60—39.37)

This invention relates to a rotary internal combustion engine of the four stroke cycle type.

Engines of this type that have been proposed so far have all kinds of draw-backs with regard to the operation and construction thereof, as a result of which said engines have not found acceptance in actual practice.

The object of the present invention is to provide an engine of the type in question which is structurally simple and which has an acceptable useful effect.

To achieve this end the engine according to the invention is characterized by a rotary piston whose operative periphery cooperates with the operative periphery of a stationary or counter-rotating engine cylinder, four or more compression chambers being arranged in equidistantly spaced relationship along said periphery of the cylinder for effecting the successive phases of the four stroke cycle internal combustion process in cooperation with the operative periphery of the piston.

If there are four compression chambers and one operative piston periphery, the successive phases of the four stroke cycle combustion process take place during one revolution of the piston, namely the sucking of a fresh mixture or air into an operative portion between the cylinder and the piston, the compression thereof in a compression chamber, the ignition, and finally the exhaust of combustion gases from said compression chamber. After a subsequent quarter of one revolution the same piston has performed one revolution in respect of the subsequent compression chamber and thus the ignition of a charge in and the exhaust of combustion gases from a successive combustion chamber will take place during every quarter of a revolution. The result thereof is a very regular turning moment and an absence of vibrations resulting from unbalanced forces of inertia.

The rotary engine according to the invention may be so formed that the piston in the form of a disc having one or more concentric and one or more eccentric peripheral portions is adapted to rotate in a box-shaped cylinder, having a cylindrical periphery, the compression chambers provided with igniting means or with fuel injection means being secured to said periphery of the cylinder and being in open communication with the interior of said cylinder.

For every four compression chambers one concentric and one eccentric peripheral portion of the piston is required, while if there is a multiple of four compression chambers the concentric and the eccentric peripheral portions alternate with each other.

These and many other features of the engine according to the invention will be further elucidated with reference to the accompanying drawings showing an embodiment of said engine.

In said drawings:

FIG. 3 is a side view of a portion of the engine partly in a section on line III—III in FIG. 1;

FIG. 4 is a sectional view on line IV—IV in FIG. 2 and

FIG. 5 is an elevational view of the engine piston partly in section perpendicular to the main shaft.

Figure 1:
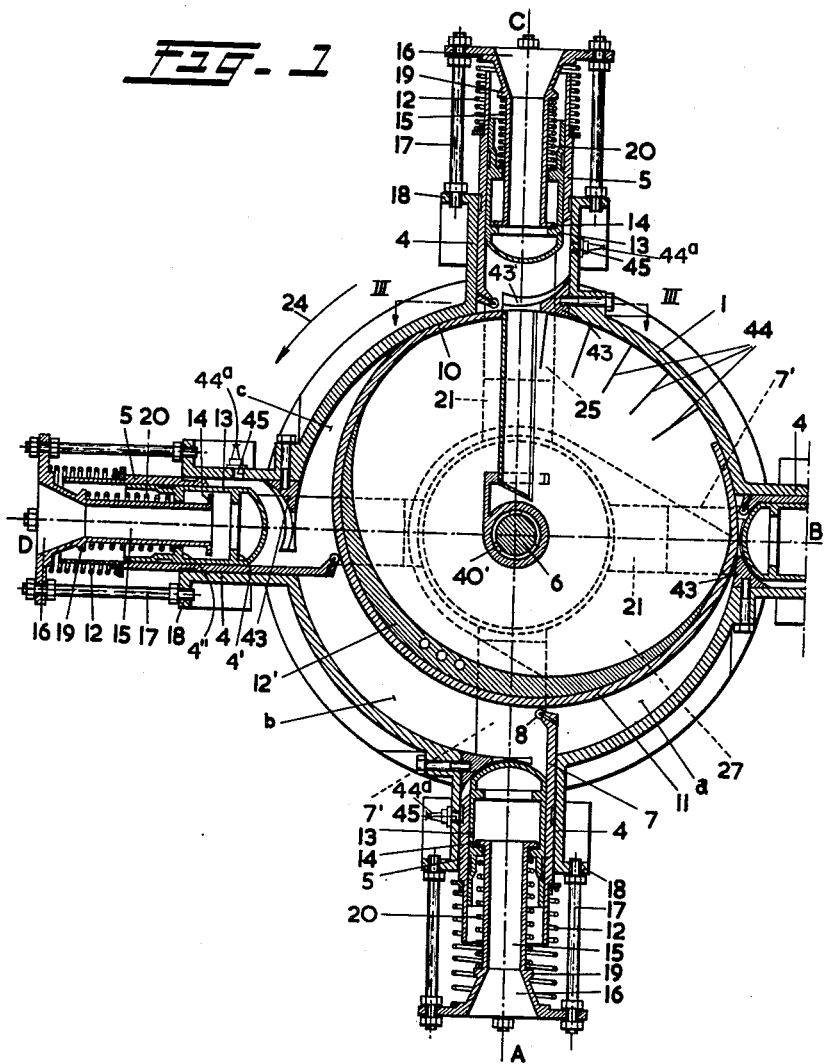
FIG. 1 is a sectional view taken perpendicularly to the main shaft of the engine.

In the embodiment of FIGS. 1, 2, 3, 4 and 5, according to the figures the rotary internal combustion engine comprises a box-shaped cylinder 1 having a cylindrical periphery and two flat covers 2, 3 secured thereto by means of bolts. Said cylinder 1 has four cylindrical projections 4 equidistantly spaced along its periphery, in each of which a sliding sleeve 5 defining a compression chamber is so mounted as to be displaceable axially and, as seen from the main shaft 6 of the engine, radially. It should be noted, however, that the cylindrical projections 4 may also be directed obliquely or may be offset relative to the main shaft 6. Each sliding sleeve comprises a radially inwardly directed baffle 7 extending over three quarters of its periphery, which extension has sides 7' and 7", and which at its free end carries around hard steel pin 8, the axis of which pin runs parallel to the main shaft and which pin is mounted for rotation in the sides 7' and 7". By means of this pin the sliding sleeve is in contact with the outer periphery of the engine piston 9 secured to the main shaft, which piston partly has a concentric periphery 10 and partly an eccentric periphery 11. It will be noted that periphery 11, which is a continuous curvilinear periphery, is tangent at each end to the cylindrical inner surface of the cylinder 1, and has a maximum eccentricity, relative to the cylindrical inner surface of the cylinder, at a point midway between its ends. Helical compression springs 12 ensure constant contact between the sliding sleeves 5 and the rotary piston 9. The sides 7' and 7" of the baffle 7 as it were embrace the main piston and laterally seal the same. A counterweight 12' effects the balancing of the main piston.

Within each sliding sleeve a compression chamber piston 13 is provided, which is adapted to be moved relative to the sliding sleeve between limits defined by a ledge 14 provided at the end of a sleeve 15 whose opposite end 16 is flared and is secured by means of bolts 17 to flanges 18 of the cylindrical projection 4. Said abutting edge or rim 14 cooperates with the abutting rims 4' and 4" of piston 13 to limit its displacement. A helical compression spring 20 bearing against a stationary ledge 19 on sleeve 15 biases the compression chamber piston 13 in radial inward direction. At 21 part of the material of the cylinder covers 2, 3 is cut away to form guideways for the sides or parts 7' and 7" of the baffle 7 so that the pin 8 can freely follow the periphery 10, 11 of the piston.

The engine piston 9 is in the form of a hollow, flat disc including a pair of axially spaced end walls and a peripheral wall interconnecting the end walls, the eccentric periphery 11 of which is entirely closed, but the concentric periphery 10 of which is largely open, so that said periphery 10 has a gap of a width equalling the space between the side walls 22, 23 of said piston. As seen looking in the direction of rotation of the piston according to the arrow 24 a radially extending blade 25 is located adjacent the beginning of the concentric peripheral portion blade 25 is the main blade and extends from the periphery of the piston to the main shaft 6. Said blade is in the form of a tube having a longitudinal slot in its trailing wall surface. As will be described hereinafter the combustion gases are guided through the slot of said tube in the direction of rotation and, owing to the reaction resulting from their pressure and expansion, they cause the piston to rotate. The main blade 25 is followed by a number of follower blades 26, which are shorter, but which likewise point radially inwardly from the concentric periphery 10, said follower blades being intended to convert the subsequent pressure surges of the combustion gases into kinetic energy.

Figure 2:
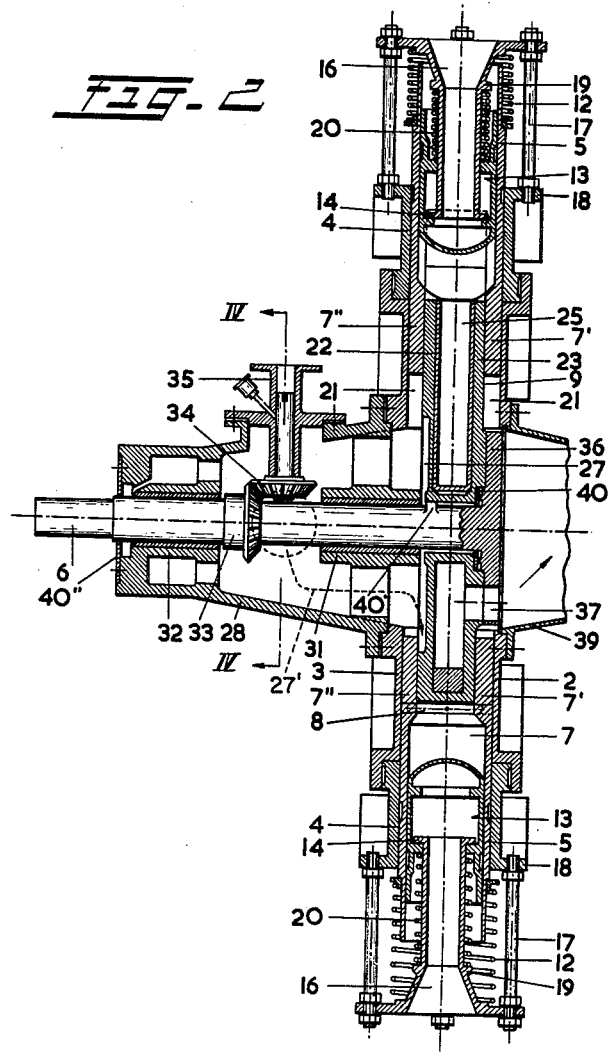
FIG. 2 is a sectional view according to the main shaft of the engine.

Adjacent its centre the piston wall 22 is provided with a flat broad recess 27, which serves as inlet duct as indicated by arrow 27 (vide FIGURES 1, 2 and 5). In all the positions of the engine piston said recess is in communication with the inlet formed by a housing 28 bolted to the cylinder cover 3, which inlet (vide FIGURE 4) splits up into two branches 29 to which bends 30 are connected which comunicate with carburetors (not shown) when the engine runs on a mixture of fuel and air, but if the engine operates as an injection engine the bends 30 constitute the air inlets and in that case they may carry air filters (likewise not shown).

The housing 28 further has bearings 31, 32 for the main shaft 6 extending to one side of the engine piston, which shaft furthermore has a bevel gear 33 secured thereto and which is in mesh with another bevel gear 34 mounted on a shaft 35 for driving the ignition apparatus or the fuel pump (neither of which is shown) in accordance with the combustion process taking place in the engine.

At the other side of the piston the main shaft 6 ends in a large flange 36 provided with ports 37, 38 for the passage therethrough of the combustion gases which after having acted on the blades 25, 26 and leaving the engine through ports in the piston that register with said ports 37, 38, pass through the exhaust tube 39. The flange 36 also forms the means for fastening the engine piston 9 on the main shaft 6, a sealing ring 40 being provided between said flange and piston in order to prevent fresh gas or air respectively, which might leak along the shaft 6, from mixing with the combustion gases. Furthermore the piston 9 is centred on the shaft 6 by studs 40'. Adjacent the free end of the shaft 6 the housing 28 is closed by a sealing ring 40".

The periphery of the cylinder and the projections 4 are provided with cooling ribs 41 and 42 respectively (vide FIG. 3). At the side of the projections 4 located opposite the baffles 7 of the sliding sleeves guiding pieces 43, apertured at 43', are provided, which guide the flow of explosion gases originating from the compression chamber in the correct direction. The engine piston has its periphery 10 provided with saw cuts 44, which guarantee a uniform expansion upon heating of the engine.

The rotary engine according to the invention operates as follows. It is supposed that the engine is started by a starter not shown, so that the engine piston 9 starts rotating according to the arrow 24. During this movement the receding piston periphery 11 in cooperation with the tangentially stationary extension of the sliding sleeve of the relative compression chamber will create a vacuum in the space $a$ as this spaced expands so that via the recess 27 rotating along with the piston a fuel air mixture or air is sucked into said space $a$.

In the position according to FIGURE 1 said space $a$ is defined by a periphery of the piston and the periphery of the cylinder, the baffle 7 of the sliding sleeve of compression chamber A and the baffle 7 of compression chamber B.

After one quarter of a revolution the space $a$ is located between the compression chamber C and B and it is filled with a fuel-air mixture or with air that has been sucked-in. The space $b$ which was already filled has moved from the position between the compression chambers D and A into the position determined by the compression chambers A and B. The space $c$ in which the periphery 11 of the piston again runs towards the periphery of the cylinder, acts as a compression space, because during the rotation of the piston said spaced becomes smaller and smaller while the gas or air cannot escape past the baffle 7 of the sliding sleeve of the associated compression chamber, so that the compressed gas or air is—at least in the position according to FIGURE 1—driven into the compression chamber D, the piston 13 of said compression chamber being displaced radially outwardly in opposition to the pressure of the spring 20.

When the compression has been completed the combustion can take place. Said combustion can be effected either by a spark bridging the gap between the electrodes of a spark-plug 44a which is screwed into the opening 45 or by means of an atomizer provided in said opening, which atomizer is likewise not shown, by means of which fuel is injected into the compressed air. The outflowing explosion gases are directed against the rear of the main blade 25 by the guiding piece 43 and drive said blade in front of them.

Before the piston of the compression chamber has reached its innermost position the remainder of the outflowing gases have given off their energy to the follower blades 26. Subsequently the gases flow via the interior of the piston 9 and the ports 37, 38 towards the outlet 39.

When once the engine is running a combustion takes place during each quarter of a revolution of the engine piston 9 i.e. in the sequence of the compression chambers C—D—A—B. By adjusting the nuts, by means of which the flared end 16 of the sleeve 15 is secured to the bolts 17 the compression ratio of the engine can be easily changed if at the same time compression chamber pistons having another stroke are used.

Figure 1B:
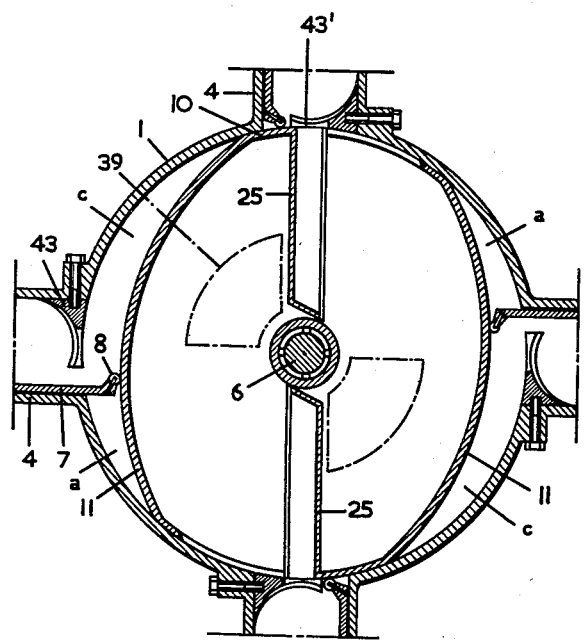
FIG. 1b is a view similar to FIG. 1, but with many parts omitted for simplification, illustrating an alternative embodiment of the engine.

FIG. 1b illustrates, with certain parts shown in FIG. 1 omitted for simplification, the embodiment of the invention in which the main piston has two groups of peripheral sections, with the concentric and eccentric peripheral sections in alternation. Two main blades 25 are provided. Space $b$ may be omitted, as it will be appreciated, from FIG. 1, that space $b$ is not a working space but merely an intermediate zone in which no working phase is effected.

It will be clear that a great many variations of details are possible without the scope of the invention being departed from. Thus a plurality of engine cylinders and pistons may be arranged alongside of each other, the continuing main shaft 6 being connected with all of the engine pistons 9.

I claim:

1. A rotary internal combustion engine comprising, in combination, a casing having a cylindrical inner surface and constituting a main cylinder; a rotatable shaft extending through said casing coaxially of said cylindrical inner surface; a substantially disk shape rotary hollow main piston secured to said shaft for rotation within said cylinder, and including a pair of axially spaced end walls and a peripheral wall interconnecting said end walls; the periphery of said piston being divided into at least one group of four consecutive sections of substantially equiangular extent; the first three leading sections of each group, considered in the direction of rotation, having a common curvilinear surface which is eccentric to said shaft, with the eccentricity increasing to a maximum at the mid-point of said common curvilinear surface, and which common curvilinear surface is tangent to the surface of said cylinder at the leading edge of the first section and the trailing edge of the third section, the fourth section of each group being substantially concentric with said shaft, and having a sliding sealing fit with the surface of said cylinder; a plurality of blades, equal in number to the total number of said main piston periphery sections, mounted in said casing in equi-angular spaced relation for radial reciprocation relative to said shaft, each blade having a width equal to the axial extent of the interior of said main piston and an inner end in continuous fluid-tight engagement with the periphery of said main piston; means biasing said blades inwardly toward said main piston; a plurality of compression chambers, equal in number to said blades, extending radially outwardly of said casing and each communicating at its inner end with said main cylinder just in advance of each respective blade in the direction of shaft rotation; combustible mixture ignition means associated with each compression chamber; a combustible mixture admission port opening axially through one side of said casing; radially extending inlet recesses in the outer surface of one end wall of said main piston, equal in number to said groups, and each continuously communicating at its inner end with said admission port and having its outer end opening through the main piston periphery throughout substantially the full angular extent of the leading peripheral section of a respective group; a driving blade extending radially of said main piston adjacent the leading edge of the trailing section of each group and in the form of a conduit having a radially outer end opening through the periphery of said main piston and a slot extending longitudinally of its trailing surface; whereby, as said shaft rotates, the space, defined by the leading peripheral section of each group and a pair of circumferentially adjacent blades, will expand to draw combustible mixture thereinto through the associated inlet recess, and the thus drawn-in combustible mixture will be compressed in the space defined by the third peripheral section of each group, a pair of circumferentially adjacent blades, and the associated compression chamber between the latter; the thus compressed mixture being ignited as the driving blade of the trailing section of each group communicates with such associated compression chamber for impulsing said main piston by the reaction of expanded gases directly rearwardly through the slot of the driving blade; and means for exhausting gases from the interior of said main piston.

2. A rotary internal combustion engine, as defined in claim 1, in which said main piston is formed with at least two of said groups of peripheral sections.

3. A rotary internal combustion engine, as defined in claim 1, including plural auxiliary driving blades, each construction in the same form as said main driving blade, and arranged consecutively with an associated main driving blade and opening through the peripheral wall of said main piston in said trailing section of each group; said auxiliary driving blades having a radial length substantially less than that of said main driving blades.

4. A rotary internal combustion engine, as defined in claim 1, in which said compression chambers are substantially cylindrical; each of said first mentioned blades comprising a cylindrical sleeve slidable axially of the associated compression chamber and each including an arcuate cross-section blade portion having a chordal width equal to the axial extent of the interior of said main piston, and a pair of extensions, one on each side of said blade portion, extending inwardly beyond the inner end of said blade portion and conjointly embracing the end walls of said main piston.

5. A rotary internal combustion engine, as claimed in claim 4, including an auxiliary piston in each compression chamber, forming the bottom thereof, and slidable axially of the associated sleeve; each auxiliary piston being reciprocably mounted for limited displacement in a substantially radial direction relative to said shaft; and means biasing each auxiliary piston toward said shaft.

6. A rotary internal combustion engine, as claimed in claim 1, in which each of said first mentioned blades has a roller rotatably mounted in its piston-periphery-engaging inner end and extending axially of said main piston.

References Cited in the file of this patent

UNITED STATES PATENTS

| | | |
|---|---|---|
| 267,675 | Cory | Nov. 21, 1882 |
| 291,522 | Kimball | Jan. 8, 1884 |
| 800,684 | Schneider | Oct. 3, 1905 |
| 1,244,529 | Mehle | Oct. 30, 1917 |
| 1,316,957 | Johanson | Sept. 23, 1919 |
| 1,339,730 | Williams | May 11, 1920 |
| 2,015,027 | Finley | Sept. 17, 1935 |
| 2,421,898 | Melrose | June 10, 1947 |